United States Patent [19]
Ratuiste et al.

[11] Patent Number: 5,589,370
[45] Date of Patent: Dec. 31, 1996

[54] PROCESS FOR ENCAPSULATING SENSITIVE MATERIALS

[75] Inventors: Florencio Ratuiste, Union; Robert Ahart, Wayne, both of N.J.; David J. Lang, Ossining, N.Y.; Liang S. Tsaur, Norwood, N.J.

[73] Assignee: Lever Brothers Company, Division of Conopco, Inc., New York, N.Y.

[21] Appl. No.: 509,931

[22] Filed: Aug. 1, 1995

[51] Int. Cl.$^6$ ............................. C12N 9/96; C11D 17/08
[52] U.S. Cl. ........................... 264/4.3; 435/177; 435/182; 435/188; 428/402.2; 428/402.21; 428/402.22; 428/402.24; 252/79.1; 510/367; 510/392; 264/4.33
[58] Field of Search ..................................... 435/188, 177, 435/182; 428/402.21, 402.22, 402.2, 402.24; 252/174.12, 174.11, 174.13, 100, 79.1, 99, 94, 102; 264/4, 4.33

[56] References Cited

U.S. PATENT DOCUMENTS

| | | |
|---|---|---|
| 3,962,383 | 6/1976 | Hagiwara et al. . |
| 4,285,720 | 8/1981 | Scher . |
| 4,426,337 | 1/1984 | Suzuki et al. . |
| 4,898,781 | 2/1990 | Onouchi et al. . |
| 4,909,953 | 3/1990 | Sadlowski et al. . |
| 5,434,069 | 7/1995 | Tsaur et al. ........................ 428/402.21 |

Primary Examiner—Herbert J. Lilling
Attorney, Agent, or Firm—Ronald A. Koatz

[57] ABSTRACT

The present invention relates to an improved curing or hardening process for the continuous production of capsules containing a sensitive material. The process allows capsules to be formed continuously without aggregating. The process is also a contained system so that exposure to possibly harmful aerosols is avoided.

7 Claims, 1 Drawing Sheet

PROCESS FOR ENCAPSULATING SENSITIVE MATERIALS

FIELD OF THE INVENTION

The present invention relates to capsules which are used to deliver desired sensitive materials to environments (e.g., harsh liquid detergent environment) in which the sensitive material might otherwise be deactivated. In particular, the invention relates to an improved curing/hardening process for encapsulating the sensitive materials.

BACKGROUND OF THE INVENTION

It has long been a desirable goal to add sensitive ingredients such as enzymes, bleaches and/or bleach catalysts to enhance the cleaning efficacy of detergent products, particularly liquid detergent products. Liquid detergents, however, often provide a hostile environment to these sensitive ingredients. For example, enzymes are subject to attack by anionic actives, high pH conditions, and/or by other enzymes. Bleaches, in particular peracid bleaches such as are taught in U.S. Pat. No. 4,909,953, are known to be particularly harsh on enzyme components.

One method of protecting sensitive components from their surrounding harsh environment is by encapsulation of the ingredients. Further, encapsulation allows sensitive and possibly harmful materials to be handled more safely.

The capsules of the present invention are prepared by combining the sensitive component/hydrophobe mixture (in embodiment of invention where hydrophobe is used) and a cross-linking polymer, and forming atomized droplets from a nozzle followed by curing the droplets in a hardening solution to form hardened capsules. The sensitive component/hydrophobe mixture is prepared by dispersing the sensitive component within the hydrophobic barrier material and then forming droplets or cores out of this material to be coated by the cross-linking polymer. This type of capsules where a barrier material and sensitive material form the core within can exist in two morphologies. The first involves a single core of structured hydrophobe (containing the sensitive component) coated with the cross-linking polymer gel. This is commonly known as a core/shell capsule. The second constitutes a number of cores of structured hydrophobe (containing the sensitive component) which are dispersed within the cross-linking polymer gel. This is commonly known as a matrix capsule.

It should be noted, that in a separate embodiment, the capsules of the present invention also apply to cases where a hydrophobic barrier material may not be a component of the capsules. In such cases, the capsules are prepared by combining the sensitive component within a cross-linking polymer and forming atomized droplets from a nozzle followed by curing the droplets in a hardening solution to form hardened capsules.

Prior arts teach various methods or processes of encapsulating materials. Some of these methods are cited in U.S. Pat. No. 4,898,781 to Onouchi et al. These include preparing a water-containing solution of a hydrophilic substance, a supporting substance, and a polyvinyl alcohol substance, and causing this solution to fall in the form of minute drops into a cross-linking agent, or into a hydrophobic agent, or into a dehydrating agent, or heating the resultant mixture under a vacuum or by spray drying thereby allowing the polyvinyl alcohol to form a coat. This patent also cites a method wherein the water-containing supporting substance having the hydrophilic substance and the cross-linking agent dissolved therein are caused to be spouted out of the central orifice of a two-wall coaxial circular nozzle of a spray drier, and at the same time, an aqueous 15% polyvinyl alcohol or modified polyvinyl alcohol solution is caused to be spouted out of the peripheral orifice of the same circular nozzle, and then dehydrating the resulting mixture as with dry air. Another cited method is by dissolving or dispersing a hydrophilic substance in a supporting substance which fails to show flowability in a dry state, spray drying the resultant mixture to form substantially spherical minute drops, and then coating the minute drops with aqueous polyvinyl alcohol or modified polyvinyl alcohol solution. The three encapsulation processes described above can be simply stated as: 1) drop-wise addition of the mixture of active containing solution and polyvinyl alcohol material into a hardening agent (a "batch" process); 2) spray drying of the aforementioned mixture using a two wall coaxial circular nozzle: and 3) spray drying of the active containing solution followed by coating of the resultant droplets with polyvinyl alcohol material. There are some processing concerns about these three prior techniques. The first method is a batch process and it can cause aggregation of encapsulates when fresh droplets come in contact with incompletely hardened droplets or with completely hardened capsules in the container containing the hardening liquid. The second and third methods entail spray drying process which is not feasible for temperature sensitive ingredients, and which may also pose a safety risk in terms of containing the fine dusts or aerosols of possibly harmful ingredients formed during spray drying.

Accordingly, it is an object of the invention to prepare the capsules of the invention in a continuous rather than batch process.

It is a further object of the invention to contain, in a closed system, possibly harmful aerosols formed during processing.

A further object of the invention is to prevent aggregation of capsules which occurs in the batch process when many capsules are formed in a container containing the hardening fluid.

Another object of the invention is to relieve these capsules of high shear and agitation required to renew the collection bath surface in the batch process.

Another objective of the invention is to avoid generation of dry, fine dust of possibly harmful ingredients during processing in a spray drying process.

These and other objectives are met by utilizing the process described below.

BRIEF SUMMARY OF THE INVENTION

The present invention relates to an improved hardening or curing process for the continuous production of capsules containing a sensitive material (as well as possibly harmful materials such as bleach catalysts, bleach precursors, or other enzymes) wherein said process comprises:

(1) mixing (a) sensitive active and, optionally, a hydrophobic component into which the active is dispersed;

(b) a cross-linking polymer solution;

into an atomizing device (e.g., by air, centrifugal atomization or high pressure) in which the components are atomized into droplets;

(2) spraying the droplets from said atomizing device onto a film of hardening liquid over a distance of at least 30 centimeters, e.g., 30 to 500 cm, preferably 50 to 150 cm, wherein said liquid is cascading continuously down the wall of a closed vessel containing both the atomizing device and a source of the hardening fluid;

(3) collecting capsules formed when the droplets and hardening liquid are contacted, and filtering the capsules from the hardening liquid; and (4) recirculating the recovered hardening liquid to the top of said closed vessel where it cascades and contacts the droplets to form additional capsules.

The present invention is also concerned with an apparatus whereby the above-described process can be practiced.

DETAILED SUMMARY OF THE INVENTION

Figure 1:
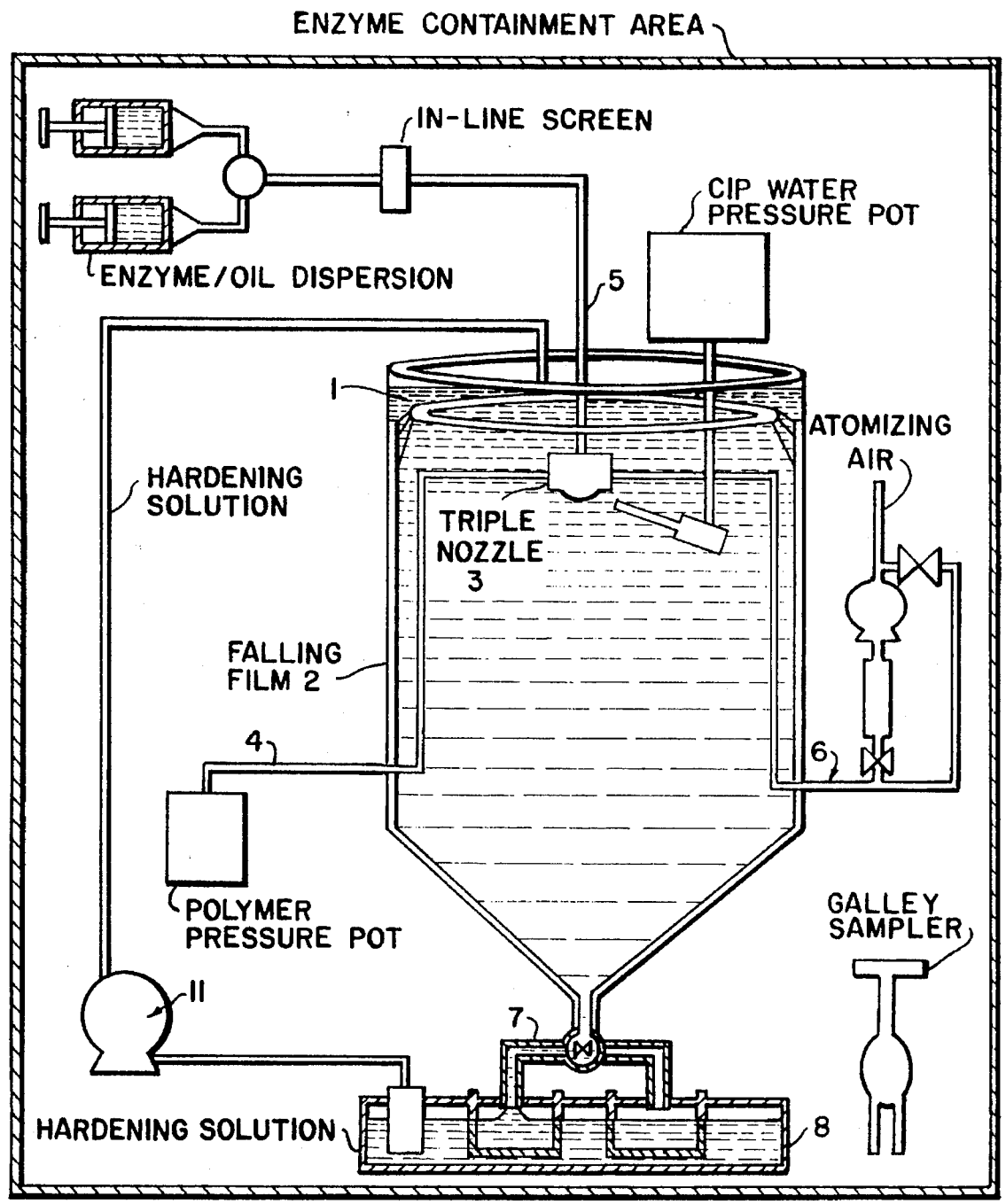
FIG. 1 depicts a typical schematic of a type of falling film contractor (with three fluid nozzle configuration) contemplated by the subject invention.

The present invention relates to an improved curing or hardening process for encapsulating a sensitive material. The capsules which are formed by the process of this invention can exist in three structures. The first involves a single core of structured hydrophobe (containing the active component) coated with the cross-linking polymer gel. This is commonly known as a core/shell capsule. The second constitutes a number of cores of structured hydrophobe (containing the active component) which are dispersed within the cross-linking polymer gel. This is commonly known as a matrix capsule. The third involves the active component dispersed within the cross-linking polymer gel (i.e., no hydrophobe). The process is a continuous process and overcomes the problems of the prior art.

For example, by cascading a hardening solution in which the capsules are formed along the side of a closed vessel and by continuously filtering the capsules out of an area in which they are collected, it is possible both to prevent aggregation of capsules as well as to avoid subjecting the capsules to the shear and agitation which is continuously required to renew the collection bath surface in a batch set up. Thus, for example, it is possible to continuously run the process for potentially unlimited time frame, in contrast to batch processes wherein, after finite time (depending on how large the collection bath is), the process must be stopped. In addition, because the encapsulation process is set up in a closed system, any harmful aerosols which are emitted from the reaction are contained. Furthermore, because no spray drying is involved, generation of dry, possibly more harmful dust is avoided, and temperature sensitive material can be feasibly processed. Finally, a continuous process is inherently more economic than a batch process.

The invention differs from a process such as described, for example, in U.S. Pat. No. 3,962,383 to Hagiwara et al., where the spray nozzle is submerged in the stream of hardening solution and where the outermost orifice of said nozzle is intended for an intermediate water-insoluble solution, rather than for air. The process of that invention requires the use of an intermediate outermost water-insoluble layer which is caused to strike several interrupting plates to have said intermediate layer destroyed thereby exposing the second layer to the hardening solution and to subsequently form into a water-insoluble film. The present invention does not require the use of an intermediate outer layer. Moreover, the present invention requires a spray distance of at least 30 cm between the nozzle and hardening liquid.

U.S. Pat. No. 4,285,720 to Scher describes an encapsulation process where an organic polyisocyanate intermediate is employed to form a polyurea capsule enclosure around a water-immiscible material dispersed in an aqueous continuous phase. Formation of droplets of the desired size in the aqueous phase is controlled by the degree of dispersion rather than by atomization. Formation of the capsule skin or enclosure is brought about by heating the continuous liquid phase or by introducing a catalyst capable of increasing the rate of isocyanate hydrolysis rather than by cross-linking of the polymer. The process as such is entirely different from the present invention.

U.S. Pat. No. 4,426,337 to Suzuki et al. teaches a jet stream containing capsule film material and capsule filler material extruded from the orifice of two coaxial conduits positioned in a cooling liquid medium. The "nozzle" is submerged in the liquid medium (in contrast to our invention where the hardening material is cascading down the wall and the droplets must travel over space to reach it) and formation of droplets is controlled by vibration of the nozzle tip rather than by atomization. Further, capsule skin or enclosure is hardened by solidification rather than cross-linking.

The capsules which are formed by the process of this invention may be those, for example, such as are defined in applicants copending U.S. Ser. No. 08/150,701 to Tsaur et al., now issued as U.S. Pat. No. 5,434,069. This reference is hereby incorporated by reference into the subject application. More specifically, those capsules are formed from the combination of (1) an oil dispersion which holds the actives in place and acts as a barrier to keep the actives from diffusing out as well as to protect the actives from harmful compounds which can diffuse in; and (2) an outer polymer shell surrounding the oil dispersion which helps prevent the deformation of the oil dispersion during and after addition of the capsule to liquid detergent.

The hydrocarbon/oil core drops in the embodiment of the invention are defined by meeting each of three defined criteria set forth below: (1) by their ability to retain active in the dispersion in an aqueous solution; (2) by their ability to withstand phase separation at ambient or elevated temperatures over time; and (3) by their ability to rapidly and effectively release the encapsulated active in use. As noted, the oils must meet all three defined criteria to be selected as the oil component of this embodiment of the invention.

According to the first criteria, the oil component is defined by its ability to retain at least 80% active, preferably 90% after adding the active in oil dispersion to an aqueous solution containing 0.5 wt. % of surfactant for an hour without mixing. Testing was done using sodium lauryl sulfate although any suitable surfactant may be used.

A second criteria by which the oil component is defined is its ability to hold the active in place and to prevent the active from diffusing or precipitating out of the oil phase. The stability of active in oil dispersion can be determined by adding the active in oil dispersion to a 10 ml graduated cylinder and measuring the phase separation of the active from the hydrophobic oil. It should be less than 10%, preferably less than 5% of phase separation when measured at 37° C. for 1 week.

The last criteria used to define the oil component is its ability to rapidly and effectively release the active in use. The oil release property can be determined by a standard Terg-O-Meter washing method. Terg-O-Meter are well known in the art such as, for example Terg-O-Tometer UR7227. In these devices, generally, 500 mls of wash liquid are agitated at above 70 rpm for about 20 minutes using desired wash liquid.

The capsules of the invention were tested using 1000 mls at 100 rpm for 15 minutes at 40° C.

The capsule should release more than 50%, preferably more than 70% of the active after the first five minutes of the wash cycle when measured at 40° C.

The hydrophobic oil component can be a liquid or a semisolid at room temperature. Liquid oils alone with a viscosity of less than 10,000 centipoises (cps) such as mineral oils, silicone oils or vegetable oils are not suitable for this invention and require modification. These oils do not have the capability to hold and retain hydrophilic actives and do not provide a sufficient protection to the active in a liquid detergent. The preferred liquid oil components are oils containing hydrophobic particles with particle size less than $3\mu$, preferably less than $1N$, more preferably less than $0.1\mu$. Examples of such hydrophobic particles are hydrophobic silica such as Cabot's Cab-O-Sil TS 720 and Cab-O-Sil TS 530 or Degussa's Aerosil 200; and hydrophobic clay such as Rheox's Bentone SD-1. These hydrophobic particles can be incorporated into the oil physically i.e., simply by mixing the oil with the hydrophobic particles or chemically, i.e., through the chemical interaction of oil with the surface of the particles. The preferred hydrophobic particles are submicron sized hydrophobically modified fumed silica such as Cab-O-Sil TS 720. These hydrophobic particles can enhance the suspension of active in the oil and also increase the capability of oil to retain the active in an aqueous solution. Typically the amount of hydrophobic particles in the oil is less than 15%, preferably less than 10%, more preferably less than 5% but more than 0.5% should be used.

In preferred embodiments of the invention, the oil component is defined by the fact that it is a semisolid rather than a liquid at room temperature. Specifically, when the component has a melting temperature of from about 35° C. to 70° C., preferably 40° C. to 65° C., the semisolids are found to retain the active more readily. Moreover, such materials release active under wash condition rapidly enough to give wash performances comparable to compositions in which enzymes have been newly added. Since these semisolid oils will also slow migration of active out of the oil phase or slow migration of bleach and other harsh components toward the active, they are again preferred.

Examples of such semisolid oils are petrolatums such as Penreco's Penreco Snow, Mineral Jelly and Tro-Grees; Witco's Multiwax; and fats (e.g., glyceryl ester of $C_{12}$–$C_{24}$ fatty acids) or fat derivatives such as mono-, di- or triglycerides and fatty alkyl phosphate ester. Hydrophobic particles such as hydrophobic fumed silica are also desirably incorporated into these semisolid oils to further enhance their ability to retain actives, especially when the capsule of this invention is processed or stored at a temperature close to or above the melting point of the semisolid oils.

The oil around the active will generally comprise about 98% to 40%, preferably 90% to 70% of the active in oil dispersion.

The polymer suitable for the polymer shell of the capsule of the invention must be insoluble in the composition of the liquid cleaning product and must disintegrate or dissolve during the use of the product simply by dilution with water, pH change or mechanical forces such as agitation or abrasion. The preferred polymers are water soluble or water dispersible polymers that are or can be made insoluble in the liquid detergent composition. Such polymers are described in EP 1,390,503; U.S. Pat. No. 4,777,089; U.S. Pat. No. 4,898,781; U.S. Pat. No. 4,908,233; U.S. Pat. No. 5,064,650 and U.S. Ser. Nos. 07/875,872 and 07/875,194, all of which are incorporated by reference into the subject application.

These water soluble polymers display an upper consulate temperature or cloud point. As is well known in the art (P. Molyneaux, Water Soluble Polymers CRC Press, Boca Raton, 1984), the solubility or cloud point of such polymers is sensitive to electrolyte and can be "salted out" by the appropriate type and level of electrolyte. Such polymers can generally be efficiently salted out by realistic levels of electrolyte (<10%). Suitable polymers in this class are synthetic nonionic water soluble polymers including: polyvinyl alcohol; polyvinyl pyrrolidone and its various copolymers with styrene and vinyl acetate; and polyacrylamide and its various modification such as those discussed by Molyneaux (see above) and McCormick (in Encyclopedia of Polymer Science Vol 17, John Wiley, New York). Another class of useful polymers are modified polysaccharides such as carrageenan, guar gum, pectin, xanthan gum, partially hydrolyzed cellulose acetate, hydroxy ethyl, hydroxy propyl and hydroxybutyl cellulose, methyl cellulose and the like. Proteins and modified proteins such as gelatin are still another class of polymers useful in the present invention especially when selected to have an isoelectric pH close to that of the liquid composition in which the polymers are to be employed. The polymer solutions may comprise mixtures of any of the above mentioned polymers.

From the discussion above, it is clear that a variety of hydrophilic polymers have potential utility as the polymer coating for the capsules of this embodiment of the invention. The key is to select an appropriate hydrophilic polymer that would be essentially insoluble in the composition (preferably a concentrated liquid system) under the prevailing electrolyte concentration, yet would dissolve or disintegrate when this composition is under conditions of use. The tailoring of such polar polymers is well within the scope of those skilled in the art once the general requirements are known and the principle set forth.

The active materials which are desired to be encapsulated by the capsule of this embodiment of the invention are those materials which will lose their activity in a cleaning product, especially a bleach-containing liquid cleaning product, if no hydrophobic oil coating is added according to this invention. The active materials protected by the oil layer may be a hydrophilic active (e.g., enzyme or bleach catalyst) or a hydrophobic active (e.g., perfume) and can be solid, liquid or in aqueous solution. If it is a solid material, the particle size of the active should be less than $200\mu$ preferably less than $50\mu$. Of course, since a hydrophobic active is generally readily protected by an oily layer and is generally not readily degraded by harsh components in composition, the benefits of the invention are more readily apparent when the active ingredient is a hydrophilic one. Hydrophilic active materials include enzymes, bleach catalysts peracid bleaches, bleach activators and optical brighteners.

It should be noted that the capsules of the invention need not contain an oil or hydrophobe as additional component and that the invention primarily is defined by providing a novel method for curing or hardening the capsule.

One preferred ingredient of the capsules disclosed herein is an enzyme. The enzymes may be amylases, proteases, lipases, oxidases, cellulases or mixtures thereof. The amylolytic enzymes for use in the present invention can be those derived from bacteria or fungi. Preferred amylolytic enzymes are those described in British Patent Specification No. 1,296,839, cultivated from the strains of *Bacillus licheniformis* NCIB 8061, NCIB 8059, ATCC 6334, ATCC 6598, ATCC 11,945, ATCC 8480 and ATCC 9945A. A particularly preferred enzyme is an amylolytic enzyme produced and distributed under the trade name, Termamyl, by Novo Industri A/S, Copenhagen, Denmark. These amylolytic enzymes are generally sold as granules and may have activities from about 2 to 10 Maltose units/milligram. The amylolytic enzyme is normally included in an amount of from 1% to 40% by weight of the capsule, in particular from 5 to 20% by weight.

The active may also be a proteolytic enzyme. Examples of suitable proteolytic enzymes are the subtilisins which are obtained from particular strains of *B. subtilis* and *B. licheniformis,* such as those commercially available under the trade names Maxatase, supplied by Gist-Brocades NV, Delft, Netherlands, and Alcalase, supplied by Novo Industri A/S, Copenhagen, Denmark. Particularly preferred are the proteases obtained from a strain of Bacillus having a maximal activity throughout the pH range of 8–12, being commercially available under the trade names of Esperase and Savinase, sold by Novo Industri NS. These proteolytic enzymes are generally sold as granules and may have enzyme activities of from about 500 to 50,000 glycine units/milligram. The proteolytic enzyme is normally included in an amount of from about 1% to about 40% by weight of the capsule, in particular of from 5% to 20% by weight.

Lipolytic enzymes may also be included in order to improve removal of fatty soils. The lipolytic enzymes are preferably included in an amount of from about 1% to about 40%, preferably from 5% to 20% by weight. Cellulase enzymes may be used in an amount from about 1% to 40% by weight of the capsule.

The total content of the enzyme in the capsules of the present invention is from about 1% to about 40%, preferably from about 5% to about 20%.

It should be understood that the enzyme may also be a genetically engineered variation of any of the enzymes described which have been engineered to have a trait (e.g., stability) superior to its natural counterpart.

The protected active may also be peroxygen compound activators, peracid bleaches, bleach catalysts, optical brighteners or perfumes.

Peroxygen compound activators are organic compounds which react with the peroxygen salts (e.g. sodium perborate, percarbonate, persilicate) in solution to form an organic peroxygen acid as the effective bleaching agent. Preferred activators include tetraacetylethylenediamine, tetraacetylglycoluril, glucosepentaacetate, xylose tetraacetate, sodium benzoyloxybenzene sulfonate and choline sulfophenyl carbonate. The activators may be released from the capsule to combine with peroxygen compound in the composition.

When activator is included, the ratio between the peroxygen in solution and the activator lies in the range of from 8:1 to 1:3, preferably 4:1 to 1:2, and most preferably is 2:1.

Although peroxyacids are generally contemplated for use in the composition rather than the capsule, peroxyacid compounds may be used as the active in the capsule as well, particularly in compositions where conditions are so harsh as to deactivate the peroxyacid.

Generally the peroxyacids are amido or imido peroxyacids and are present in the range from about 0.5 to about 50%, preferably from about 15 to about 30% by weight of the capsule. Preferably, the peroxyacid is an amide peracid. More preferably, the amide is selected from the group of amido peracids consisting of N,N'-Terephthaloyl-di(6-aminopercarboxycaproic acid) (TPCAP), N,N'-Di(4-percarboxybenzoyl)piperazine (PCBPIP), N,N'-Di(4-Percarboxybenzoyl)ethylenediamine (PCBED), N,N'-di(4-percarboxybenzoyl)-1,4-butanediamine (PCBBD), N,N'-Di(4-Percarboxyaniline)terephthalate (DPCAT), N,N'-Di(4-Percarboxybenzoyl)-1,4-diaminocyclohexane (PCBHEX), N,N'-Terephthaloyl-di(4-amino peroxybutanoic acid) ($C_3$ TPCAP analogue called TPBUTY) N,N'-Terphthaloyl-di(8-amino peroxyoctanoic acid) ($C_7$ TPCAP analogue called TPOCT), N,N'-Di(percarboxyadipoyl)phenylenediamine (DPAPD) and N,N'-Succinoyl-di(4-percarboxy)aniline (SDPCA). Such compounds are described in WO 90/14,336.

Other peroxyacids which may be used include the amidoperoxy acids disclosed in U.S. Pat. Nos. 4,909,953 to Sadowski and U.S. Pat. No. 5,055,210 to Getty, both of which are incorporated by reference into the subject application.

Also, the active inside the compounds may be a bleach catalyst (i.e. for activating peracids found in the composition outside the capsule).

Examples of such catalysts include manganese catalysts of the type described in U.S. Pat. No. 5,153,161 or U.S. Pat. No. 5,194,416, both of which are incorporated by reference into the subject application; sulfonomine catalysts and derivatives such as described in U.S. Pat. Nos. 5,041,232 to Batal, U.S. Pat. No. 5,045,223 to Batal and U.S. Pat. No. 5,047,163 to Batal, all three of which are incorporated by reference into the subject application.

More particularly, manganese catalysts include, for example, manganese complexes of the formula:

$$[LMn(OR)_3]Y \qquad \qquad IV$$

wherein

Mn is manganese in the +4 oxidation state;

R is a $C_1$–$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$–$C_{60}$ radical having at least 3 nitrogen atoms coordinating with the manganese; and Y is an oxidatively-stable counterior.

The sulfonomines include compounds having the structure:

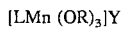

wherein:

R[1] may be a substituted or unsubstituted radical selected from the group consisting of hydrogen, phenyl, aryl, heterocyclic ring, alkyl and cycloalkyl radicals;

R[2] may be a substituted or unsubstituted radical selected from the group consisting of hydrogen, phenyl, aryl, heterocyclic ring, alkyl, cycloalkyl, $R^1C\!\!=\!\!NSO_2R^3$, nitro, halo, cyano, alkoxy, keto, carboxylic, and carboalkoxy radicals;

R[3] may be a substituted or unsubstituted radical selected from the group consisting of phenyl, aryl, heterocyclic ring, alkyl, cycloalkyl, nitro, halo and cyano radicals;

R[1] with R[2] and R[2] with R[3] may respectively together form a cycloalkyl, heterocyclic, and aromatic ring system.

Sulfonomine derivatives include compounds having the structure:

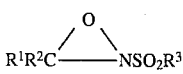

wherein:

$R^1$ may be a substituted or unsubstituted radical selected from the group consisting of hydrogen, phenyl, aryl, heterocyclic ring, alkyl and cycloalkyl radicals;

$R^2$ may be a substituted or unsubstituted radical selected from the group consisting of hydrogen, phenyl, aryl, heterocyclic ring, alkyl, cycloalkyl,

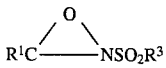

nitro, halo, cyano, alkoxy, keto, carboxylic and carboalkoxy radicals;

$R^3$ may be substituted or unsubstituted radical selected from the group consisting of phenyl, aryl, heterocyclic ring, alkyl, cycloalkyl, nitro halo, and cyano radicals;

$R^1$ with $R^2$ and $R^2$ with $R^3$ may respectively together form a cycloalkyl, heterocyclic, and aromatic ring system.

Bleach activators are particularly good candidates for bleach encapsulation both because they are used in very small amounts and because they are readily deactivated in solution.

More specifically, bleach activators are used in an amount from about 1% to 30% by weight of the capsule composition, preferably, 3% to 15% by weight.

As mentioned above, the actives may also be optical brighteners or perfumes.

As formulated, the actives formulation generally comprises about 5–25% active, preferably 10–20% active in remainder oil solution. The oil is any one or mixture of oil as defined above and typically might be 15–45% TroGrees and 40–75% Petrolatum.

The polymer solution typically comprises an about 2 to 10% active cross-linking polymers (e.g., polyvinyl alcohol) in 50 to 70% water and typically comprising some thickening agent (e.g., acrylate copolymer), and an alkali solution for adjusting pH (e.g., to about 7 to 8).

Finally, the hardening solution generally will comprise an about 10–25% electrolyte (e.g., sodium sulfate) in water, a pH buffer (e.g., Borax) and trace amounts of surfactant (e.g., sodium dodecylsulfate) and antifoam agent (e.g., silicone solution).

In a batch process as in dropwise addition of the active-containing material into a solution of hardening solution, e.g., U.S. Ser. No. 08/150,701 and at least one embodiment of U.S. Pat. No. 4,898,781 to Onouchi et al., capsules accumulate in the bath of hardening solution and must be collected periodically. Aggregation is common (from incompletely hardened capsules contacting other incompletely hardened capsules or even completely hardened capsules) and the capsules have limited time to harden or cure without aggregating, because hardening begins as soon as the hydrophobe/polymer droplets are contacted with the hardening solution where there are already other capsules present (which can be a mix of incompletely and completely hardened capsules). Finally, since formation of droplets as well as the dropwise addition onto the hardening liquid is not done in a closed container (Onouchi et al. appears to teach open containers in the relevant embodiments), some fine aerosols can readily escape in the air.

By contrast in the subject invention the active-in-oil hydrophobe dispersion (constituting the core of the capsule) and the polymer solution (forming the capsule skin or shell) are fed into a nozzle to form atomized droplets. It should be understood that the active in hydrophobe dispersion and the polymer solution may be premixed and fed into the nozzle as an emulsion.

In any event, the droplets are then sprayed over a distance of at least 30 centimeters onto a film of hardening liquid (which is basically a pH buffered electrolyte solution) cascading down the wall of a closed vessel to form the individual capsules.

The distance which the droplets travel is limited only in a practical sense by the size of the vessel containing the encapsulation system. It can be, in general, anywhere from about 30 to 500 cm, preferably 50 to 150 cm, but, as noted above, can in principal be much greater. In fact, the longer distance often allows more discrete formation of capsules.

There is a continuous filtration of the capsules/hardening liquid mixture to separate and collect the capsules.

In addition there is a continuous circulation of capsule-free hardening liquid to the walls of the closed vessel to provide a uniform and continuously cascading film necessary for the formation and subsequent collection of capsules.

To describe the invention in greater detail, applicants direct the reader's attention to attached FIG. 1.

A typical equipment set up is presented in FIG. 1 and would consist of, but is not limited to, a closed cylindrical vessel with conical bottom and the components, described below. It should be noted that the system may be any enclosure having some form of inclined plane to create a falling film where the droplet can be sprayed onto, discharged and filtered. Thus, the shape of the vessel or the mechanism for forming the falling film is not otherwise limited in any way.

A pipe ring 1 which is located near the roof of the enclosed vessel creates the continuous film of hardening liquid 2 cascading down the wall. The ring has 0.10 to 0.30 cm diameter holes (throughout its circumference) that are spaced 0.5 to 1.50 cm apart and are directed towards the walls of the vessel. A few holes are bored at the bottom of the ring to serve as drains for any residual hardening liquid at the end of the run.

A specially designed three-fluid nozzle 3 is centrally positioned immediately below the pipe ring and is connected to the polymer line 4, the material/hydrophobe line 5, and the air line 6. The nozzle 3 is directed towards the conical section of the closed vessel to maximize spraying distance and thus provide the droplets with ample time to acquire a spherical shape before they contact the hardening liquid.

The capsule collection system is comprised of a discharge pipe 7, a reservoir 8 for the hardening liquid bath, two alternately operating screens to separate the capsules from the hardening liquid, and a centrifugal pump 11. The discharge pipe is connected to the bottom of the closed vessel and carries the capsule/hardening liquid mixture to the screens which are partially submerged in the hardening liquid bath. The centrifugal pump maintains the continuous circulation of the hardening liquid between the collection bath and the pipe ring. The suction end of the hardening liquid line is equipped with an in-line filter to prevent any sizable solid materials such as impurities or capsules which have overflowed into the bath from entering the recirculation loop.

Pumps or pressure pots are used to transport the material-in-hydrophobe dispersion and the polymer solution to the three-fluid nozzle. In-line filters are installed in the material lines to prevent clogging of the nozzle.

A flow restrictor and a pressure regulator are installed in the atomizing air line to control the air flow rate. A by-pass is also provided to enable introduction of high pressure air to blow off the nozzle tip when necessary.

A single-fluid nozzle aimed towards the tip of the three-fluid nozzle is installed for spraying high pressure water at the nozzle tip at specified time intervals. This is to clean the tip of the three-fluid nozzle of any polymeric material that might have accumulated or hardened on the nozzle tip during the spraying process. This clean-in-place mechanism will enable the encapsulation process to run for a long period of time without stopping to clean the tip of the nozzle.

It should be noted that three entry ports are used to feed the nozzle assembly in the above described figure because air is used to atomize the mixture (i.e., one part for hydrophobe, one part for polymer and one entry port for air). However, if a different atomization technique is used or if the hydrophobe and polymer are premixed, fewer entry ports (e.g., one or two) may be required. Thus, the invention is not limited to any particular number of entry pods to the nozzle assembly in any way.

In another embodiment of the invention, the invention comprises an apparatus for continuously curing or hardening capsules as described above wherein said apparatus comprises:

(a) a means for introducing capsule ingredients into atomizing device;

(b) atomizing device for atomizing capsule ingredients;

(c) enclosed vessel;

(d) means for creating a falling film of hardening or curing solution cascading down wall of said vessel;

(e) means for spraying said atomized capsule ingredients over distance of at least 30 centimeters before ingredients contact hardening solution along the walls of said vessel; and (f) means for separating the capsules from the hardening solution.

The following examples are included for illustrative purposes only and are not intended to be limiting in any way.

All percentages are intended to be percent by weight unless stated otherwise.

EXAMPLES

Example 1

The encapsulation process is started by creating the falling film of hardening liquid cascading down the walls of the enclosed vessel. This is accomplished by turning on the centrifugal pump and causing it to continuously draw hardening liquid from the bath and carry it through the pipe ring inside the vessel. The atomizing air (for this example where air is used to atomize) is activated. The enzyme-in-oil dispersion and the polymer solution are simultaneously fed by pumps into the three-fluid nozzle with the enzyme-in-oil dispersion going through the inner orifice (core) of the nozzle and the polymer solution going through the annular orifice (shell) of the nozzle. Typical material flow rates for each nozzle are 2 to 8 grams/minute (g/m) for the enzyme-in-oil dispersion, 4 to 78 g/m for the polymer solution (i.e., polymer forming shell), and 1,000 to 10,000 ml/m for the atomizing air. Capsule size is controlled by regulating the material flow rates and the atomizing air flow rate, or by using different nozzle sizes. The capsules/hardening liquid mixtures flow down the inner walls of the closed unit and are then continuously discharged onto 100-mesh screens where the capsules are separated out and stored in fresh hardening liquid. The hardening liquid is recirculated back to the bath.

The polymer enzyme-in-oil ratio in the above example is 6:1, but may range from anywhere from 1:1 to 9:1.

Table 1 summarizes the results of the steady state material balance carried out on an enzyme encapsulation run using this process. Typical formulations are tabulated in Table 2.

TABLE I

Steady State Material Balance In Falling Film Contactor

| Input Streams: | | |
|---|---|---|
| Materials | Weight (as is), g. | Solids Weight, g. |
| Polymer Solution | 703.0 | 35.2 |
| Enzyme-in-Oil | 119.0 | 119.0 |
| Total | 822.0 | 154.2 |
| Output Streams | | |
| Materials | Weight (as is), g. | % of Input Streams, g. |
| Acceptable Encapsulates | 517.22 | 62.92 |
| Oversized Capsules | 18.10 | 2.20 |
| Enzyme Lost to Hardening Liquid | 15.30 | 1.86 |
| Enzyme Lost to Storage Liquid | 0.30 | 0.04 |
| Water Released to Hardening Bath on Curing of Capsules | 271.08 | 32.98 |
| Total | 822.00 | 100.00 |

TABLE 2

Formulations

| | Weight (as is), % |
|---|---|
| Enzyme-in-Oil Dispersion | |
| Enzyme | 15.00% |
| Trogrees | 42.50% |
| Petrolatum | 42.50% |
| Polymer Solution | |
| Water | 60.72% |
| Polyvinyl Alcohol | 3.33% |
| Acrylate Copolymer | 5.95% |
| 2% NaOH | 30.00% |
| Hardening Liquid | |
| Water | 83.50% |
| Sodium Sulfate | 15.00% |
| Borax | 1.50% |
| Surfactant | 0.001% |
| Antifoam | 0.001% |

Example 2

The same as Example 1 except that the polymer solution and the enzyme-in-oil dispersion are premixed and fed through a two-fluid nozzle as a single emulsion.

Example 3 (Comparative)

The same as capsules formulation as in Example 1, except that encapsulation is done in the batch (laboratory) set up wherein the droplets are sprayed onto an agitated hardening bath to form the capsules, and wherein the process has to be stopped either due to capsule aggregation when the surface of the bath contains some capsules or to collect the capsules. Capsule aggregation in the hardening bath can occur even in the first few minutes of the run.

We claim:

1. An improved curing or hardening process for the continuous production of capsules containing an active material which active material is subject to loss of activity upon release in a cleaning product wherein said process comprises:
   (a) mixing
     (1) said active material subject to loss of activity; and
     (2) a solution of a cross-linking polymer selected from the group consisting of
       (a) nonionic water soluble polymers
       (b) polysaccharides selected from the group consisting of carrageenan, guar gum, pectin, xanthan gum, partially hydrogenated cellulose acetate, hydroxy alkyl cellulose, alkyl cellulose and mixtures thereof:
       (c) proteins: and
       (d) mixtures thereof
     into an atomizing device in which the components are atomized into droplets;
   (b) spraying the droplets from said atomizing device onto a film of hardening liquid over a distance of at least 30 centimeters, wherein said liquid is cascading continuously down the wall of a closed vessel containing both said atomizing device and a source of hardening liquid;
   (c) collecting hardened capsules formed when the droplets and hardening liquid are contacted and filtering the capsules from the hardening liquid; and
   (d) recirculating the recovered hardening liquid to the top of said closed vessel where it cascades and contacts the droplets to form additional capsules.

2. A process according to claim 1, wherein said active material is dispersed in a hydrophobic component.

3. A process according to claim 1, wherein the active material is selected from the group consisting of enzymes, peroxygen compound activators, peracid bleaches, bleach catalysts, optical brighteners and perfumes.

4. A process according to claim 1, wherein the nonionic water soluble polymer comprises of polyvinyl alcohol.

5. A process according to claim 1, wherein the hardening liquid comprises electrolyte and buffer.

6. A process according to claim 5, wherein the hardening liquid additionally comprises surfactant and antifoam.

7. A process according to claim 1, where the spraying distance is 30 to 500 cm.

* * * * *